United States Patent [19]

Ollman

[11] 3,961,738
[45] June 8, 1976

[54] APPARATUS FOR MAKING TRUSS MEMBERS

[75] Inventor: Melvin L. Ollman, Detroit, Mich.

[73] Assignee: C-O, Inc., Detroit, Mich.

[22] Filed: July 1, 1974

[21] Appl. No.: 484,703

Related U.S. Application Data

[60] Division of Ser. No. 350,158, April 11, 1973, Pat. No. 3,827,117, which is a continuation-in-part of Ser. No. 129,040, March 14, 1971, abandoned.

[52] U.S. Cl. .................................. 228/5.1; 228/13; 228/15.1; 219/80; 29/155 R
[51] Int. Cl.² .......................................... B23K 31/00
[58] Field of Search .................... 29/471.1, 475, 480, 29/155 R, 412; 228/5.1, 15.1, 5.7, 173, 178, 13; 219/79, 80, 56, 57, 58, 107

[56] References Cited
UNITED STATES PATENTS

| | | | |
|---|---|---|---|
| 3,158,731 | 11/1964 | Cape | 29/155 R X |
| 3,288,977 | 11/1966 | Keller | 219/79 |
| 3,427,699 | 2/1969 | Cape | 29/155 R |
| 3,487,861 | 1/1970 | Fahrenbach | 219/56 X |
| 3,641,303 | 2/1972 | Collins | 219/56 |

Primary Examiner—Al Lawrence Smith
Assistant Examiner—K. J. Ramsey
Attorney, Agent, or Firm—Barnes, Kisselle, Raisch & Choate

[57] ABSTRACT

A method and apparatus for forming truss members which comprise oppositely disposed channel members and struts interconnected to one another by alternately extending apices wherein the apices are welded to the channel members. The method and apparatus provides for simultaneously forming channel members from a pair of endless strips and the strut members from an endless third strip, guiding the channels in a predetermined relation to one another with the third strip therebetween and thereafter welding the apices to the channel members.

16 Claims, 40 Drawing Figures

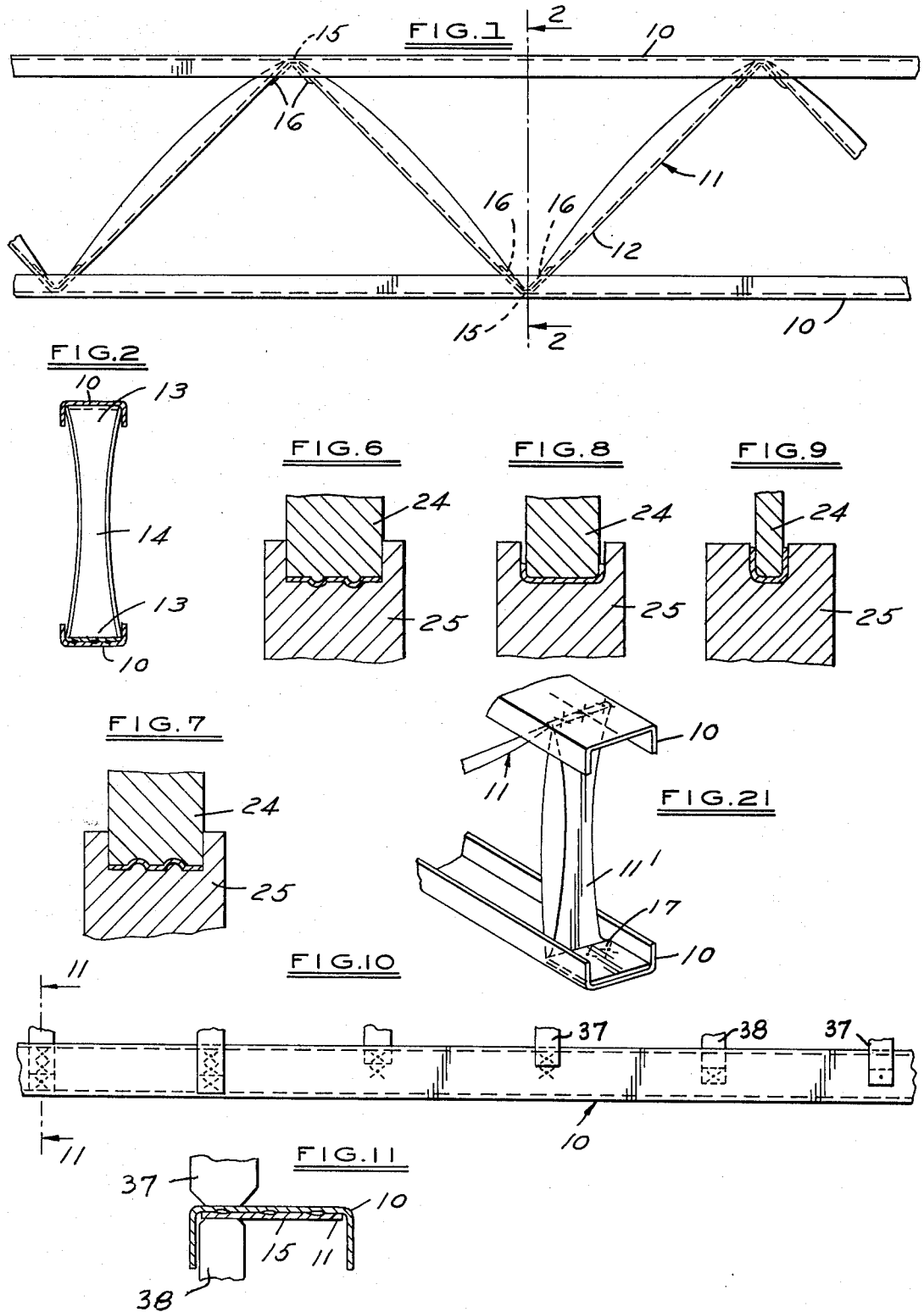

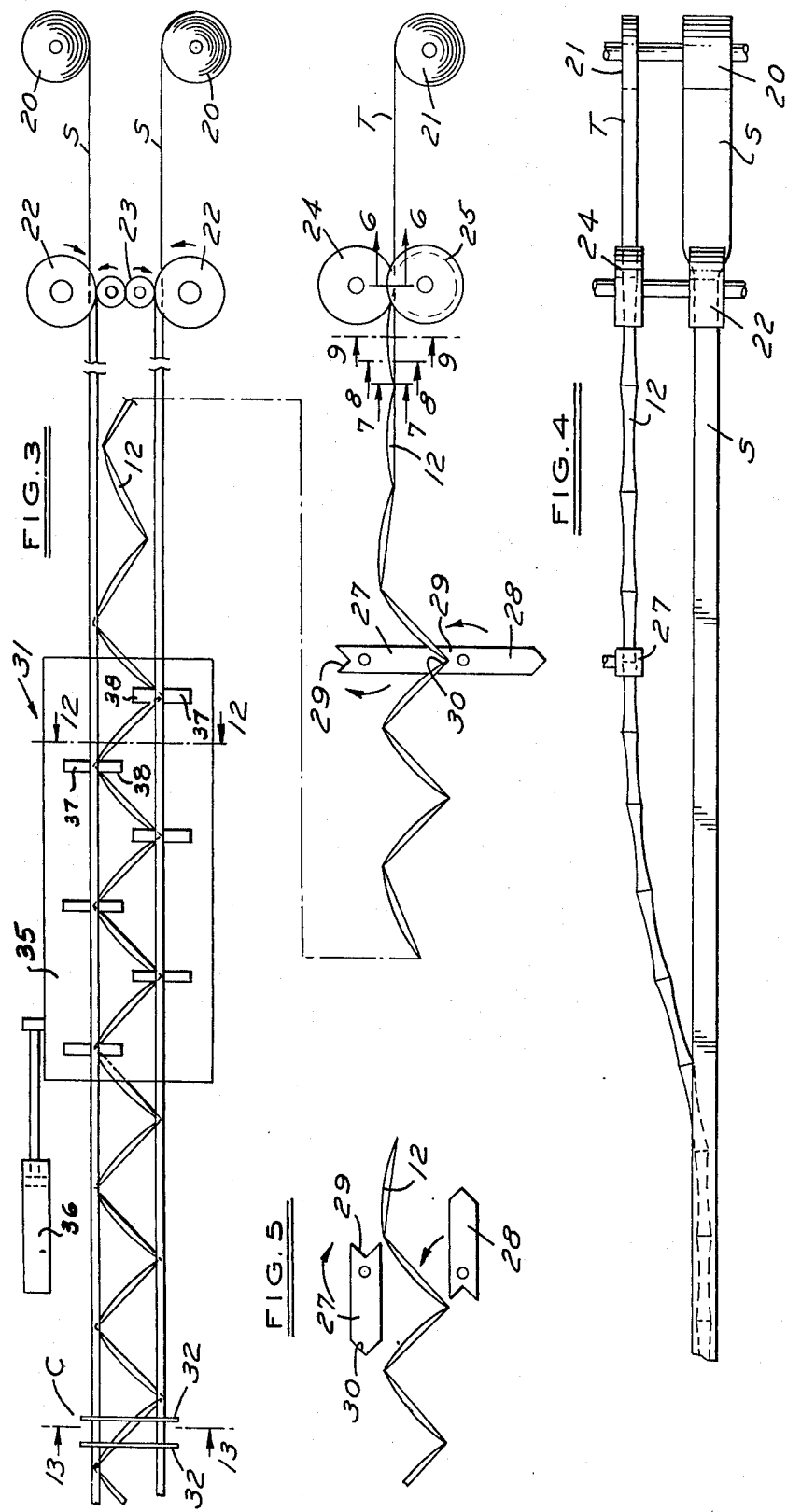

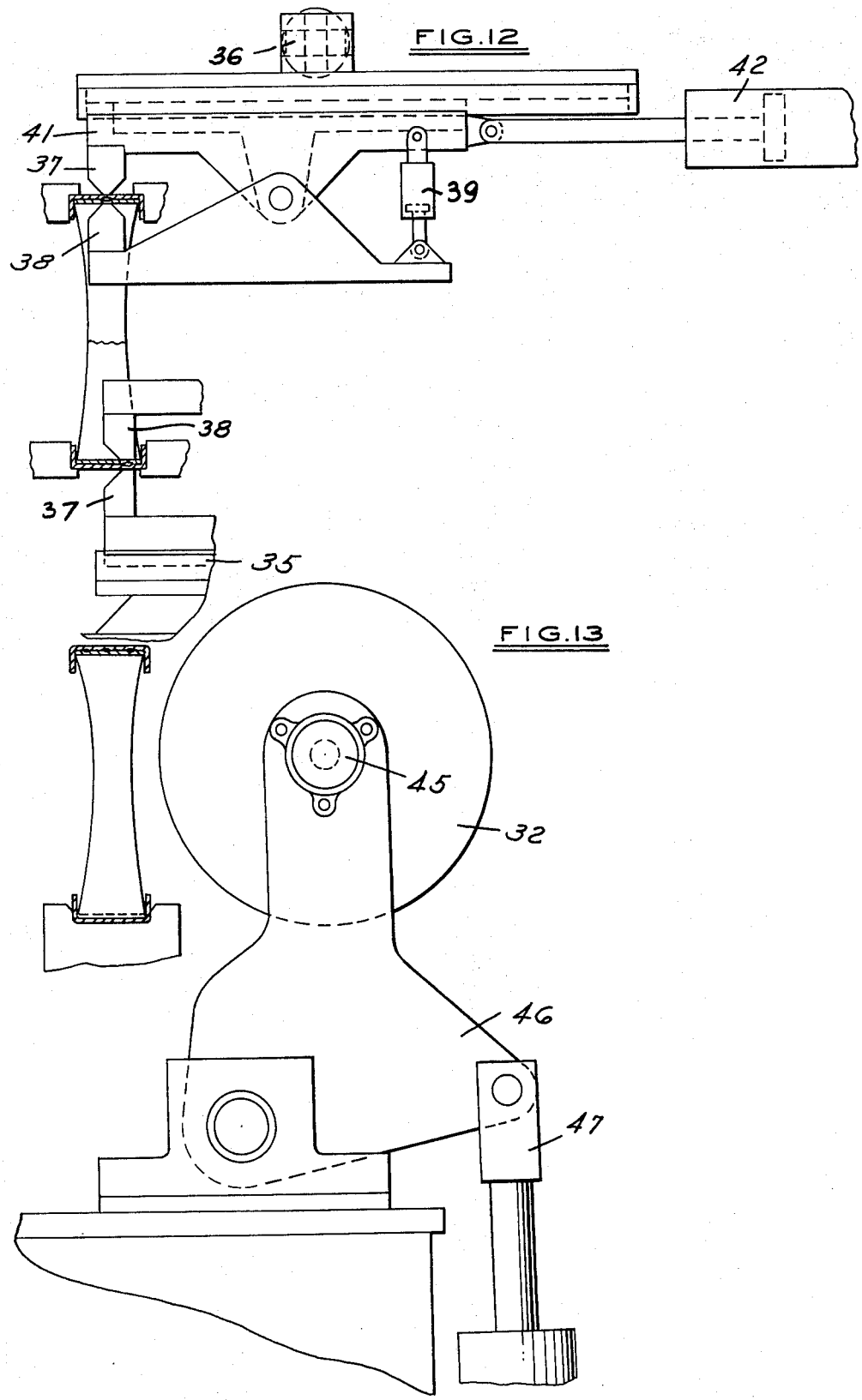

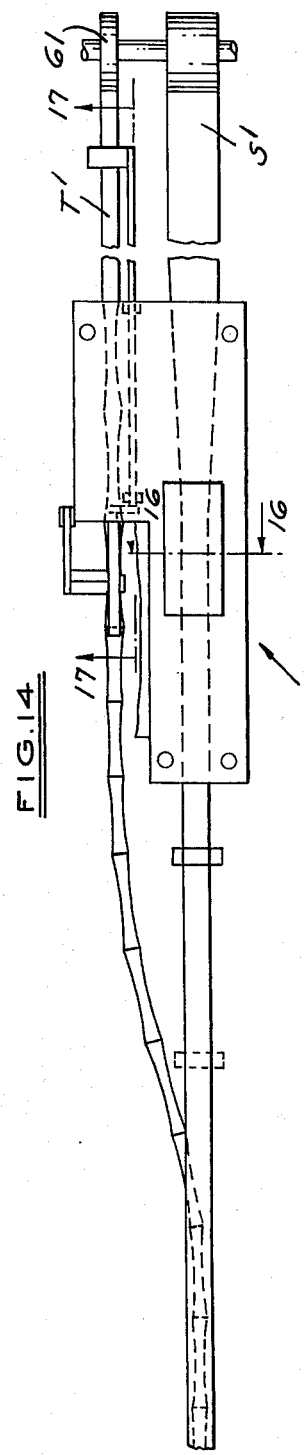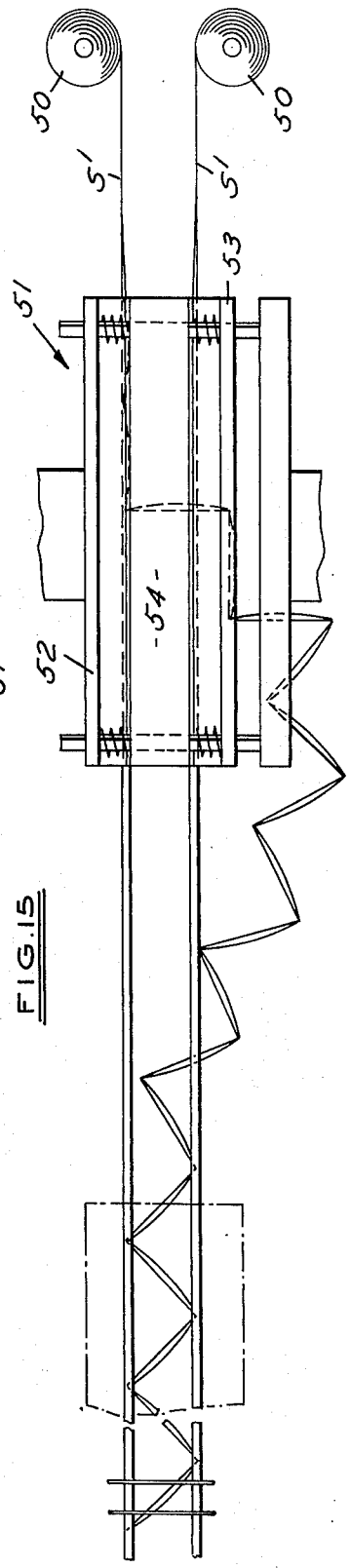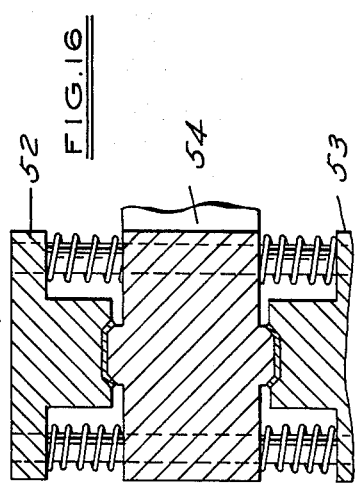

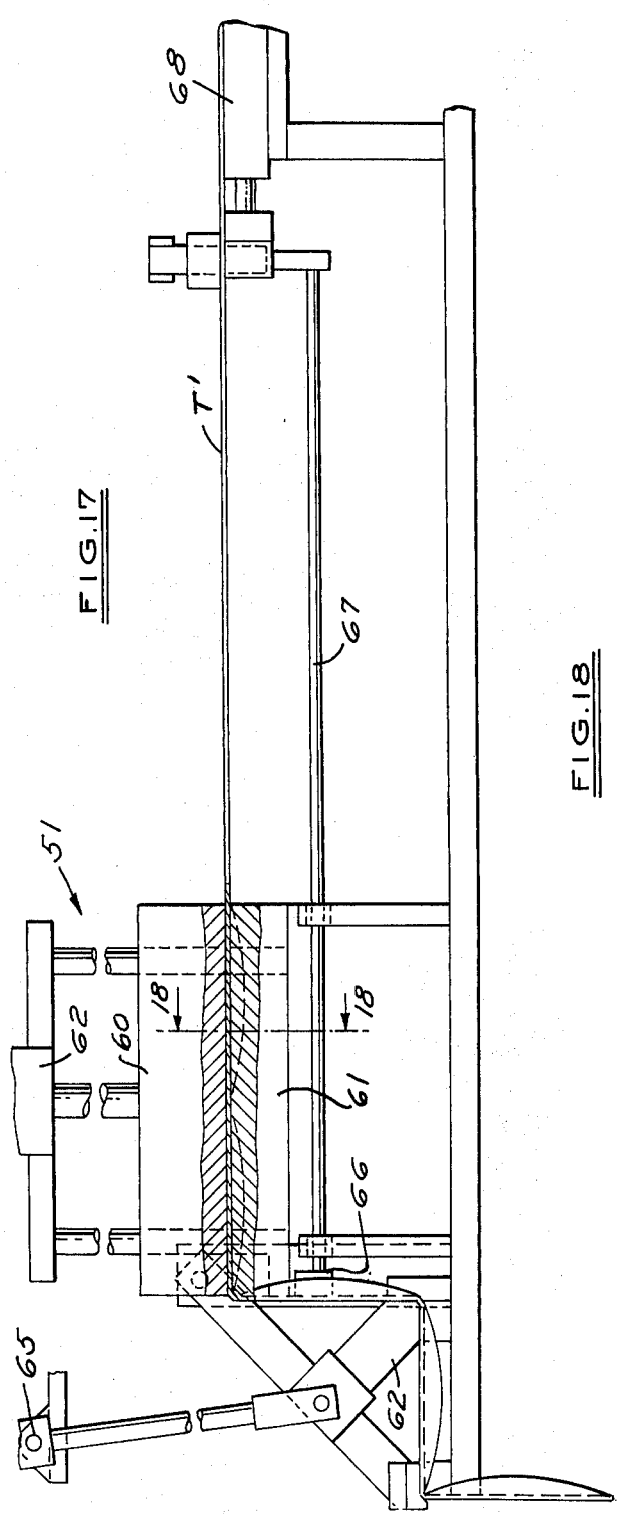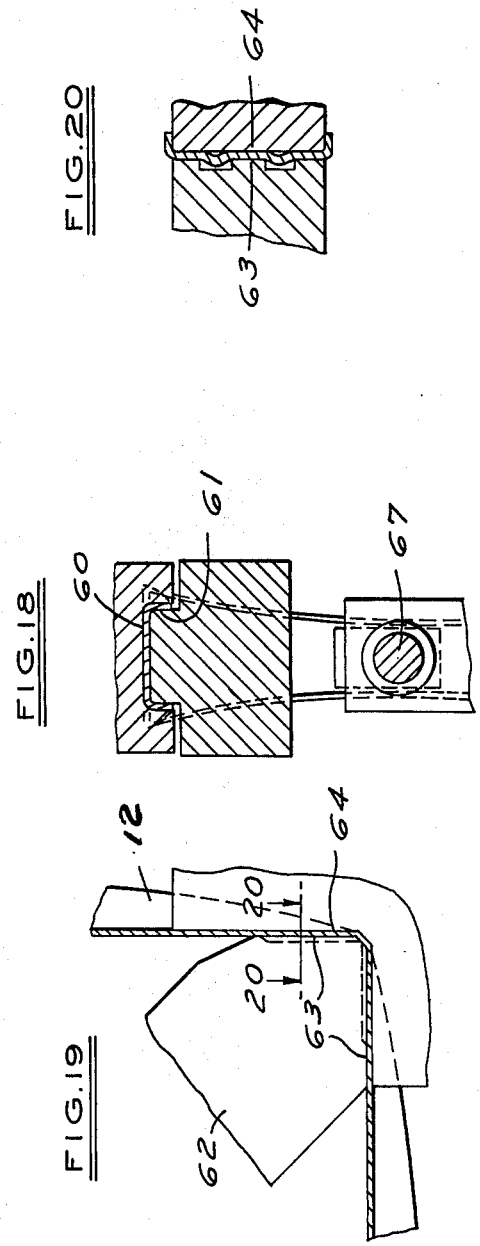

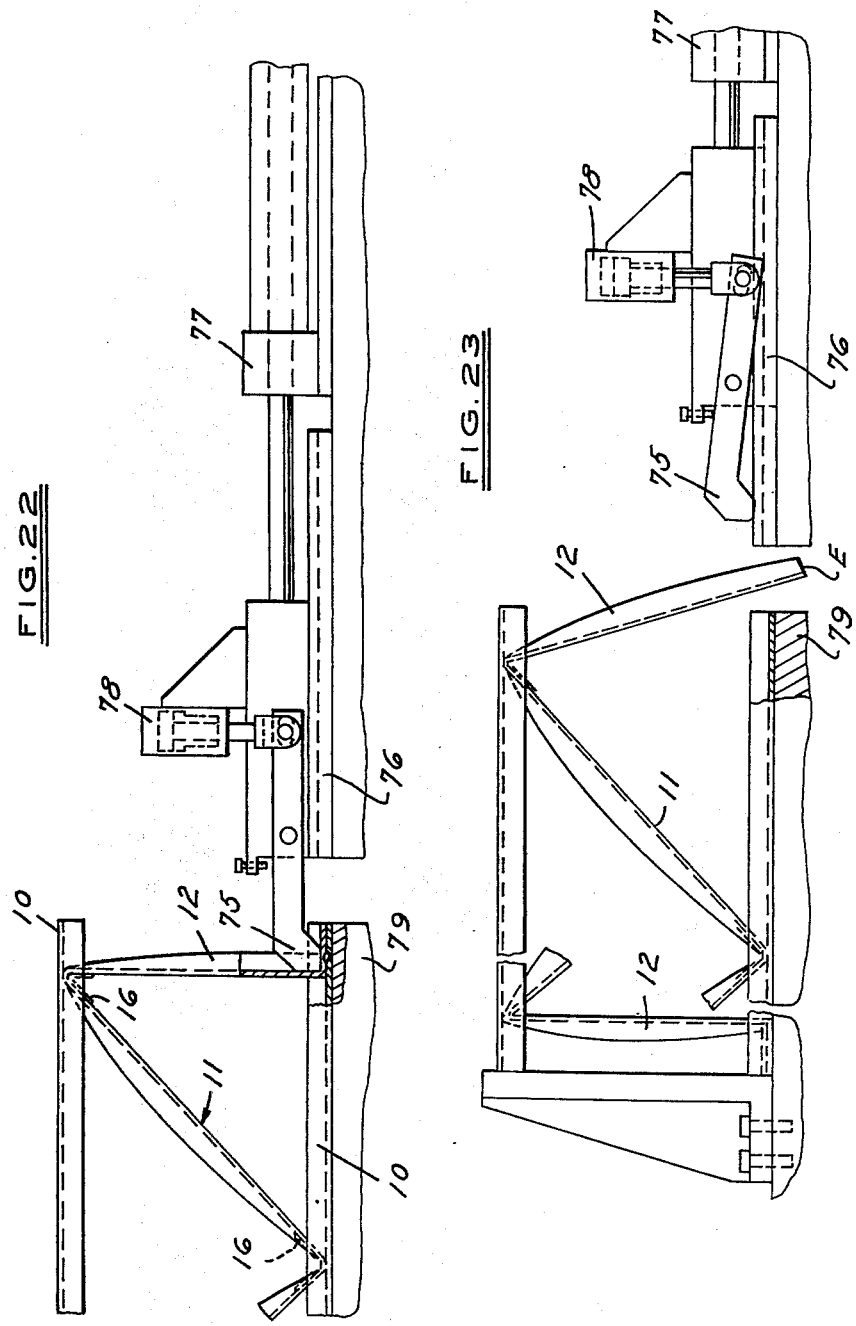

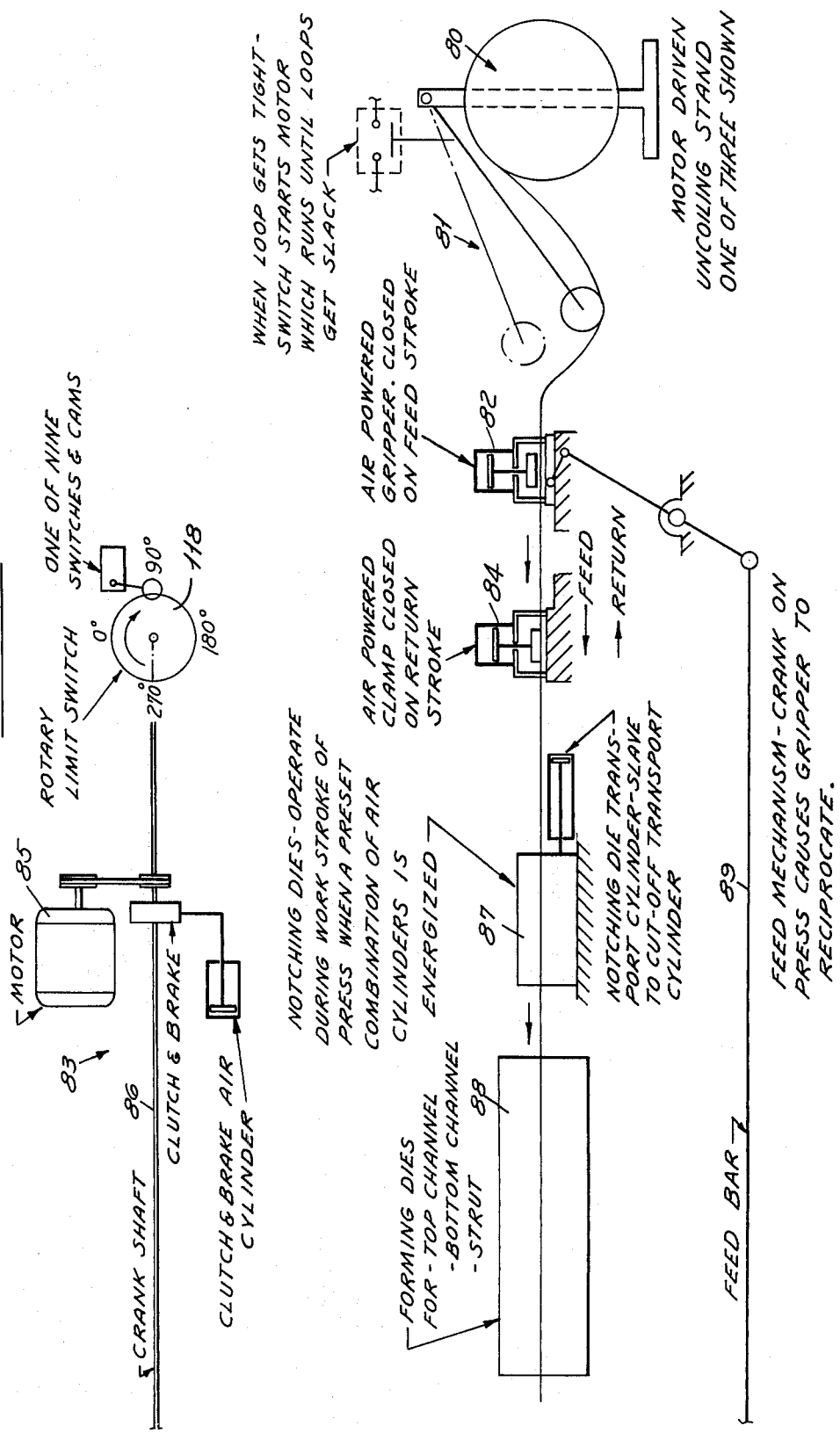

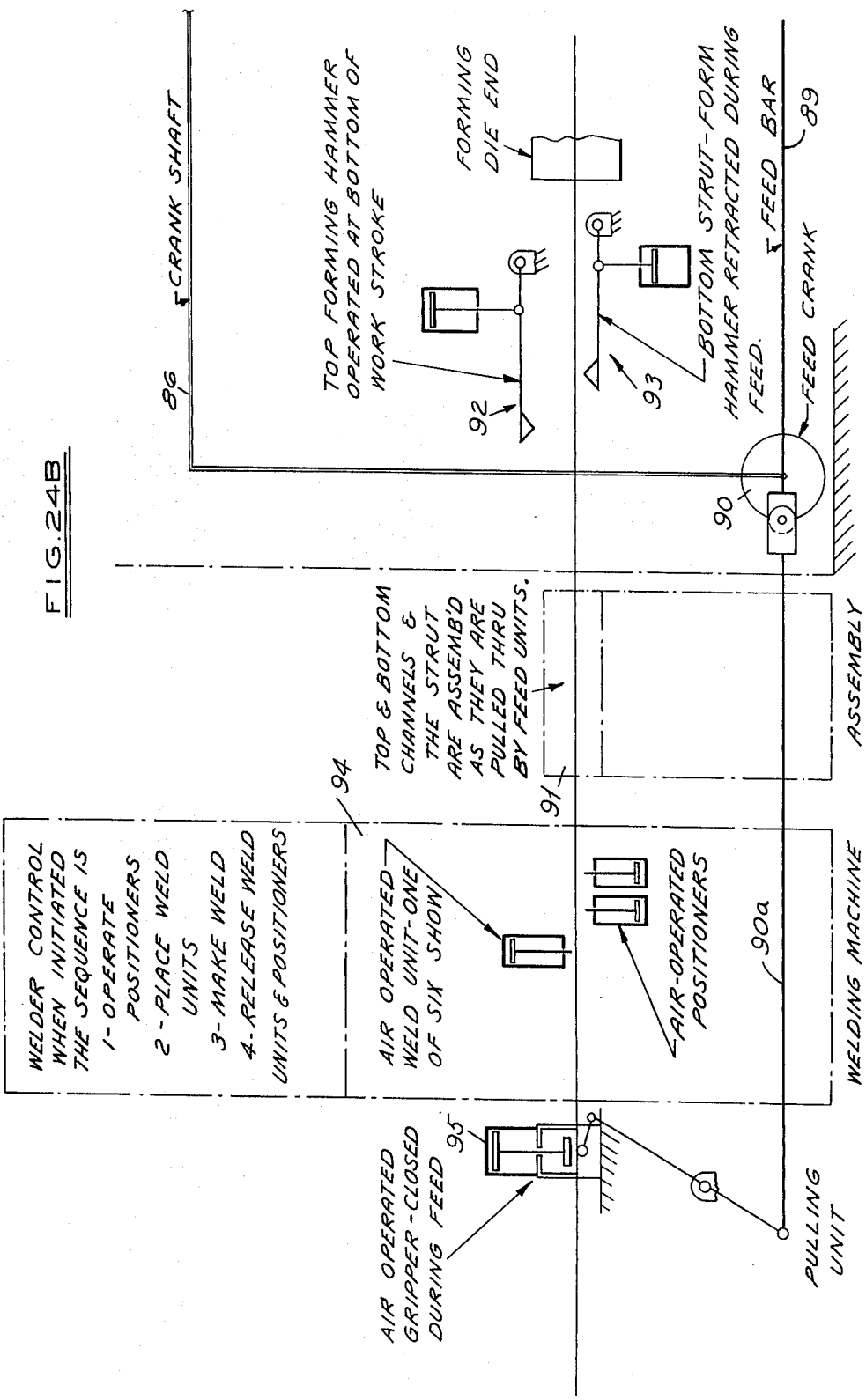

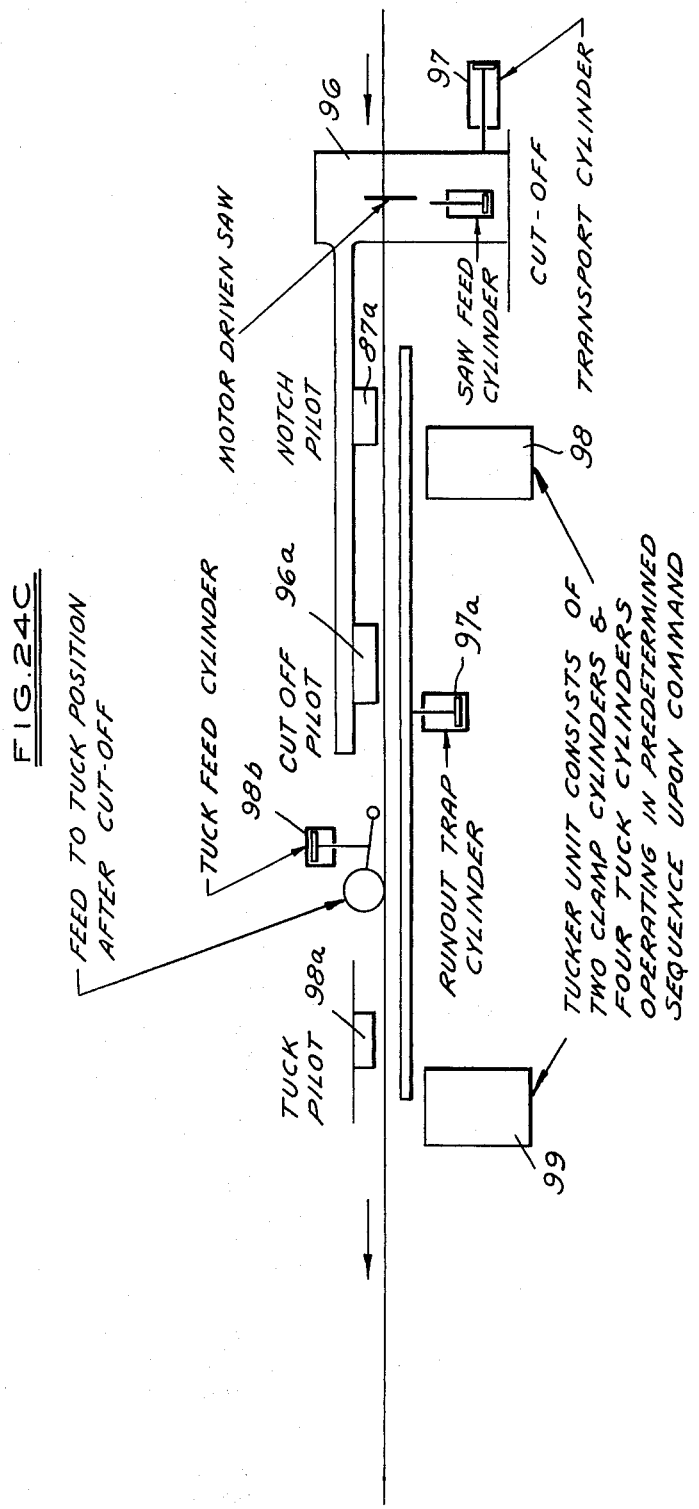

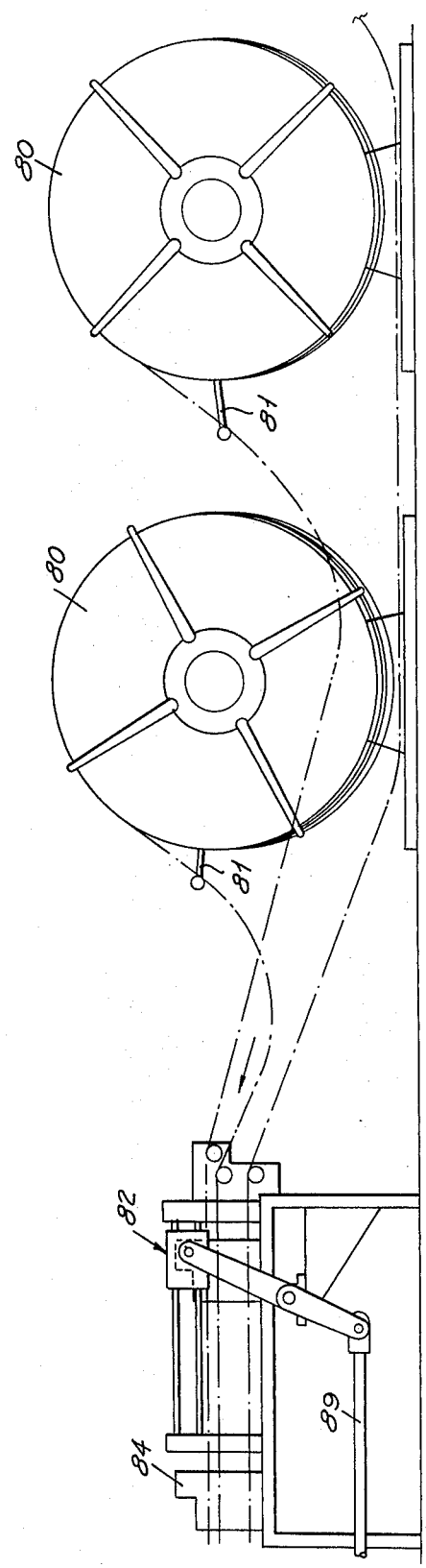

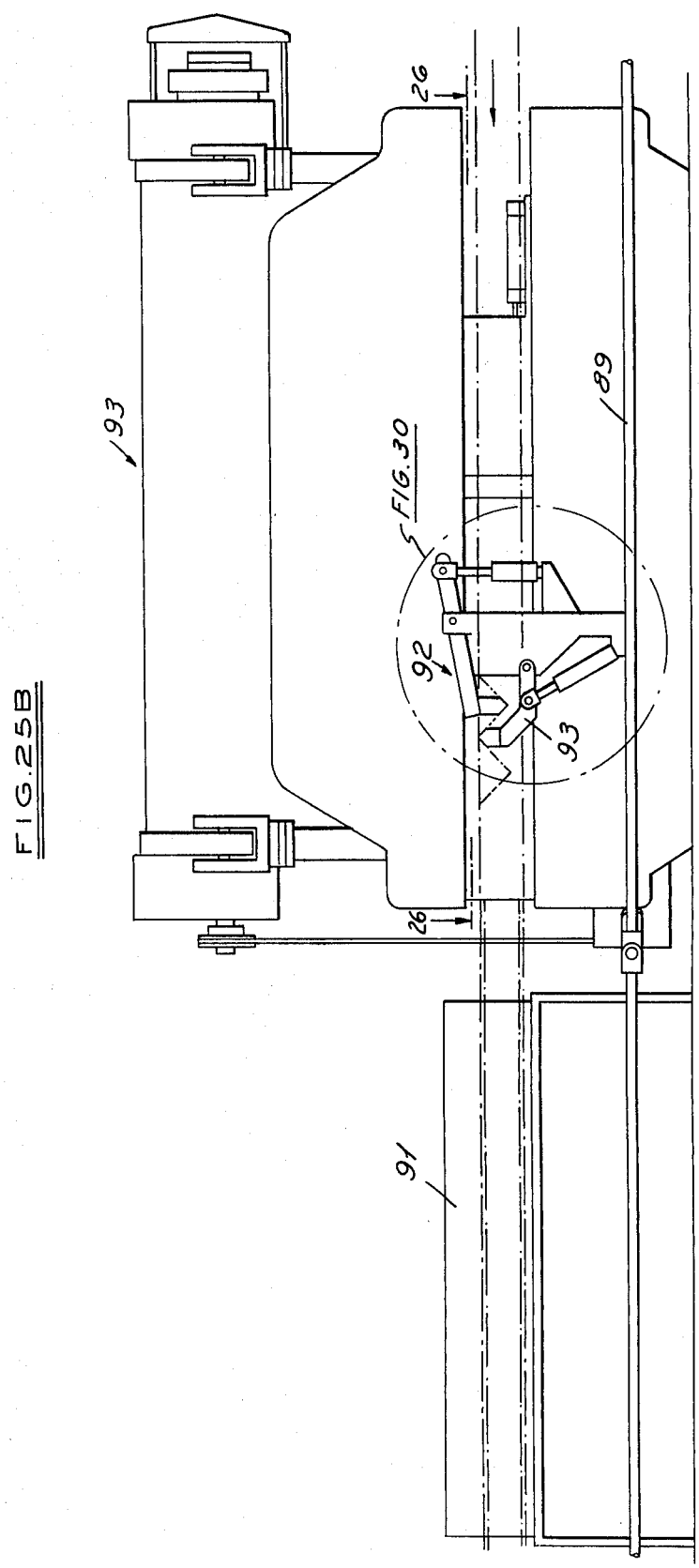

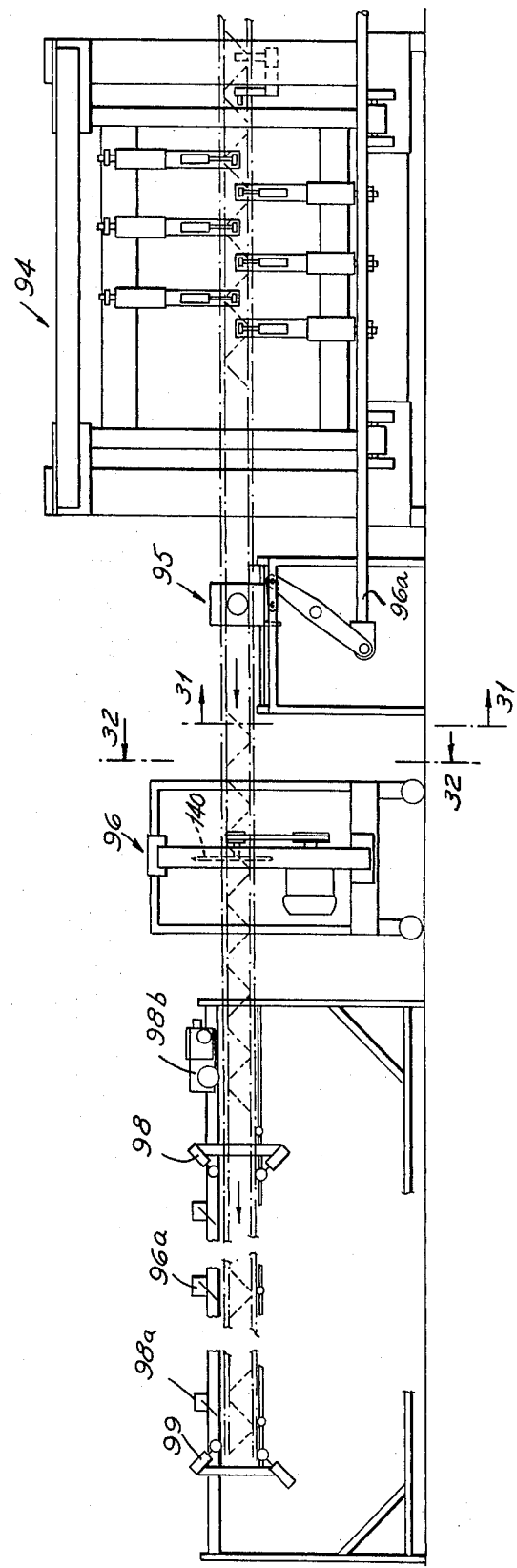

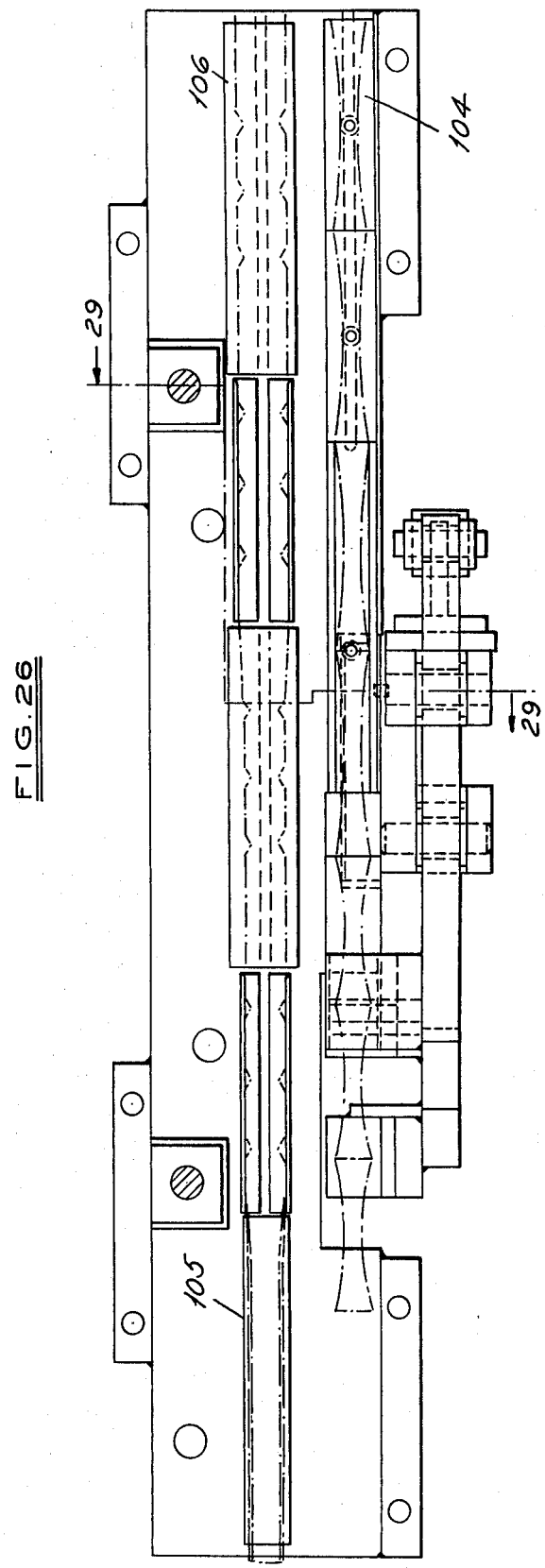

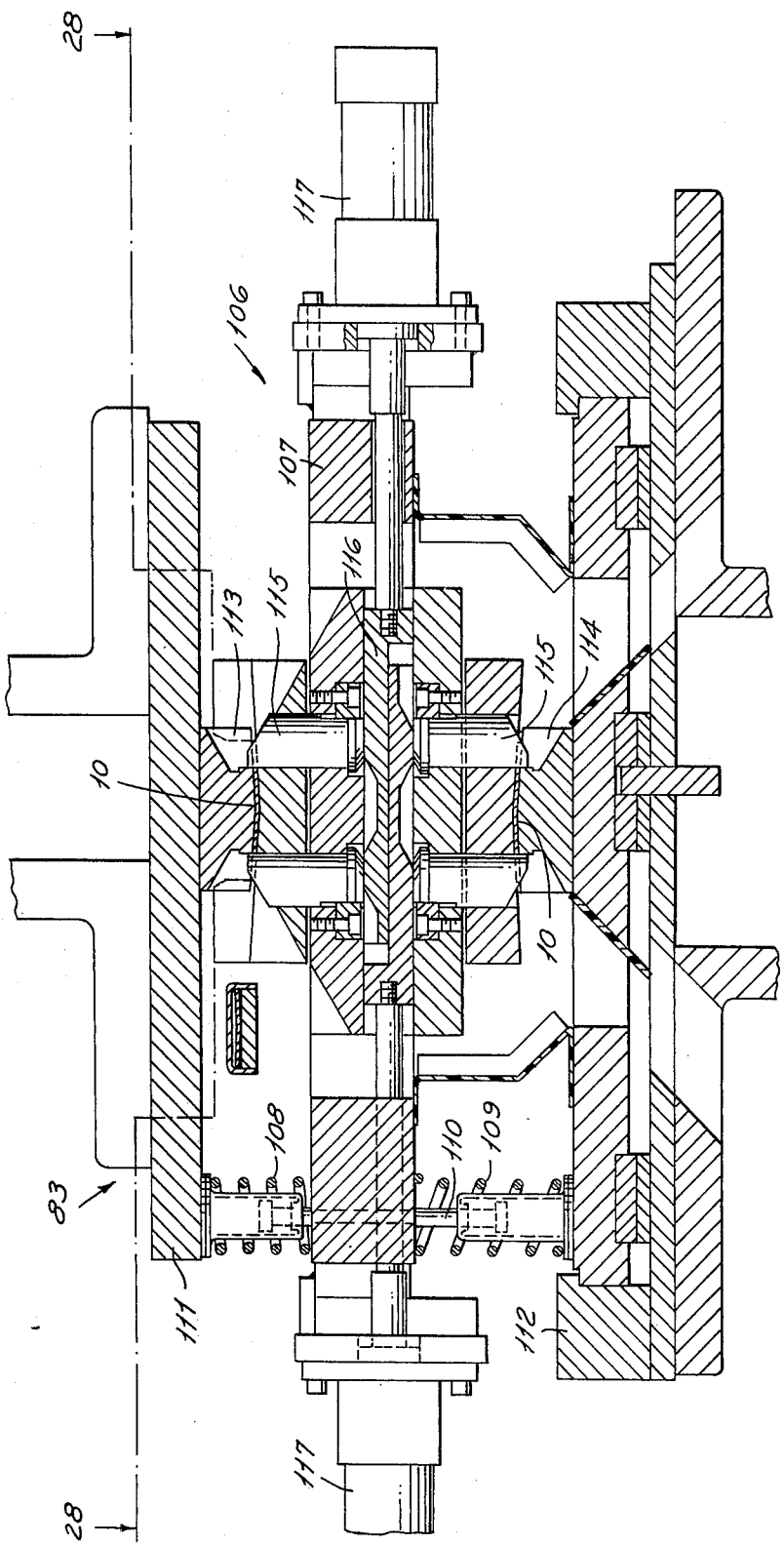

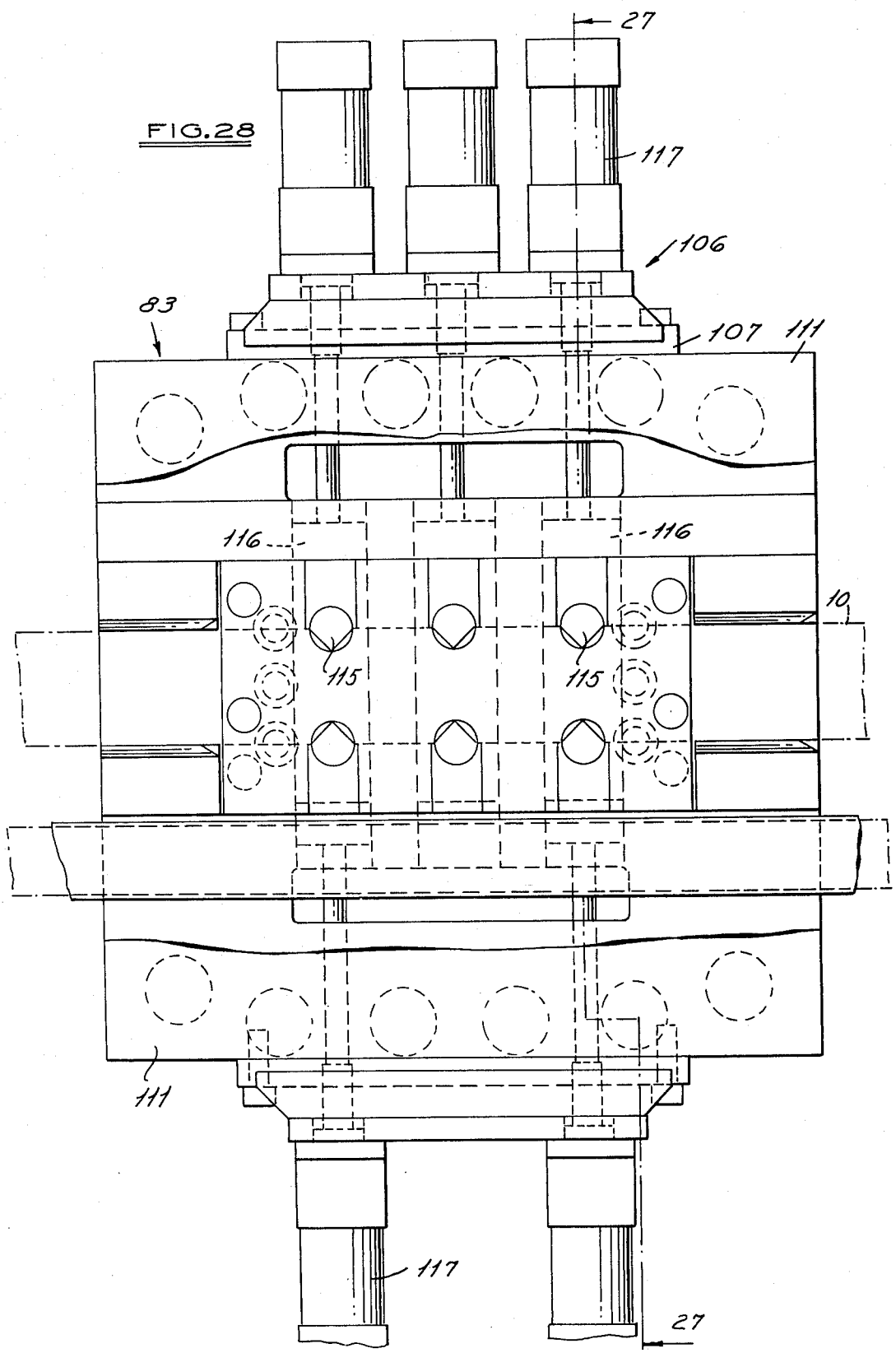

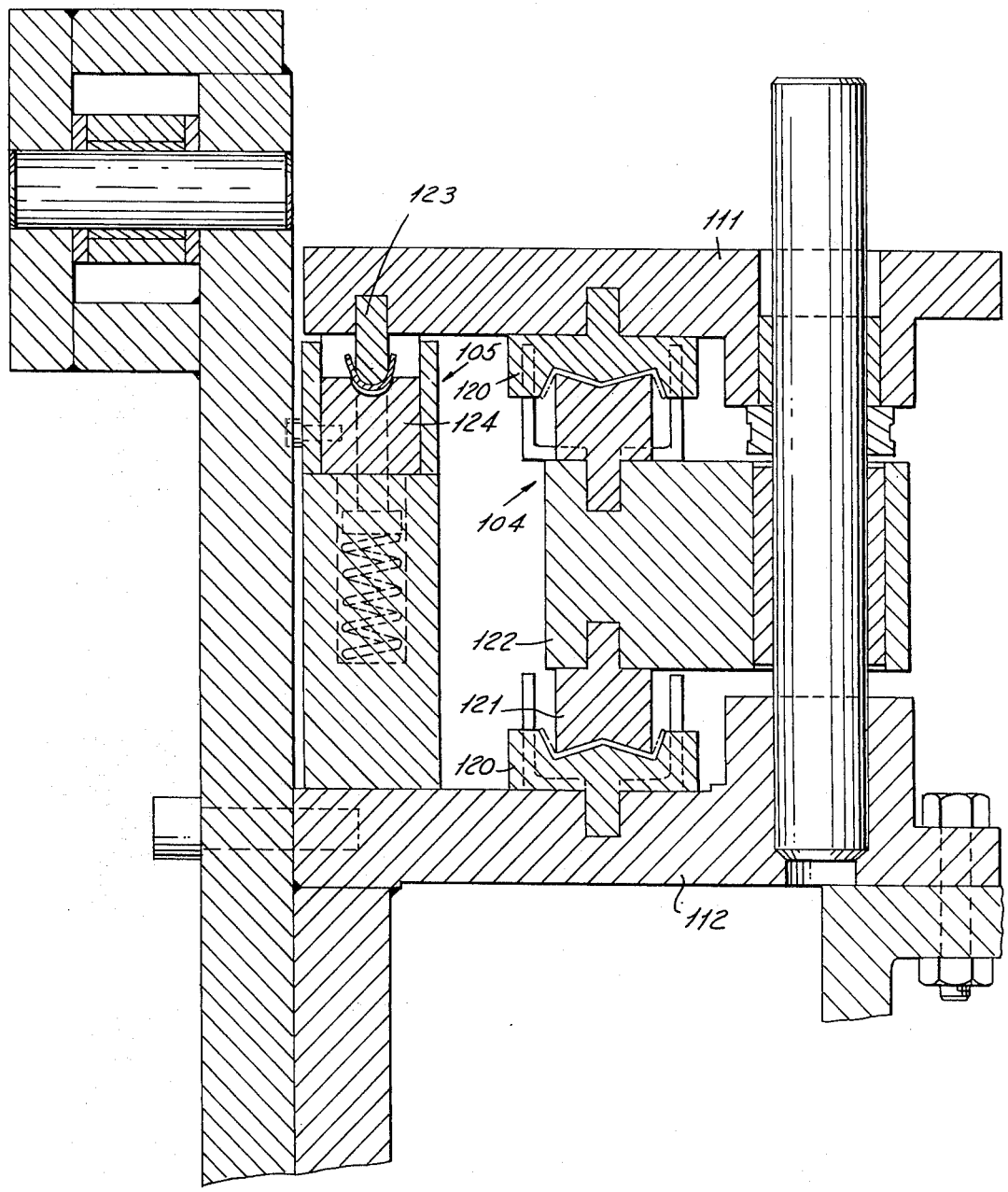

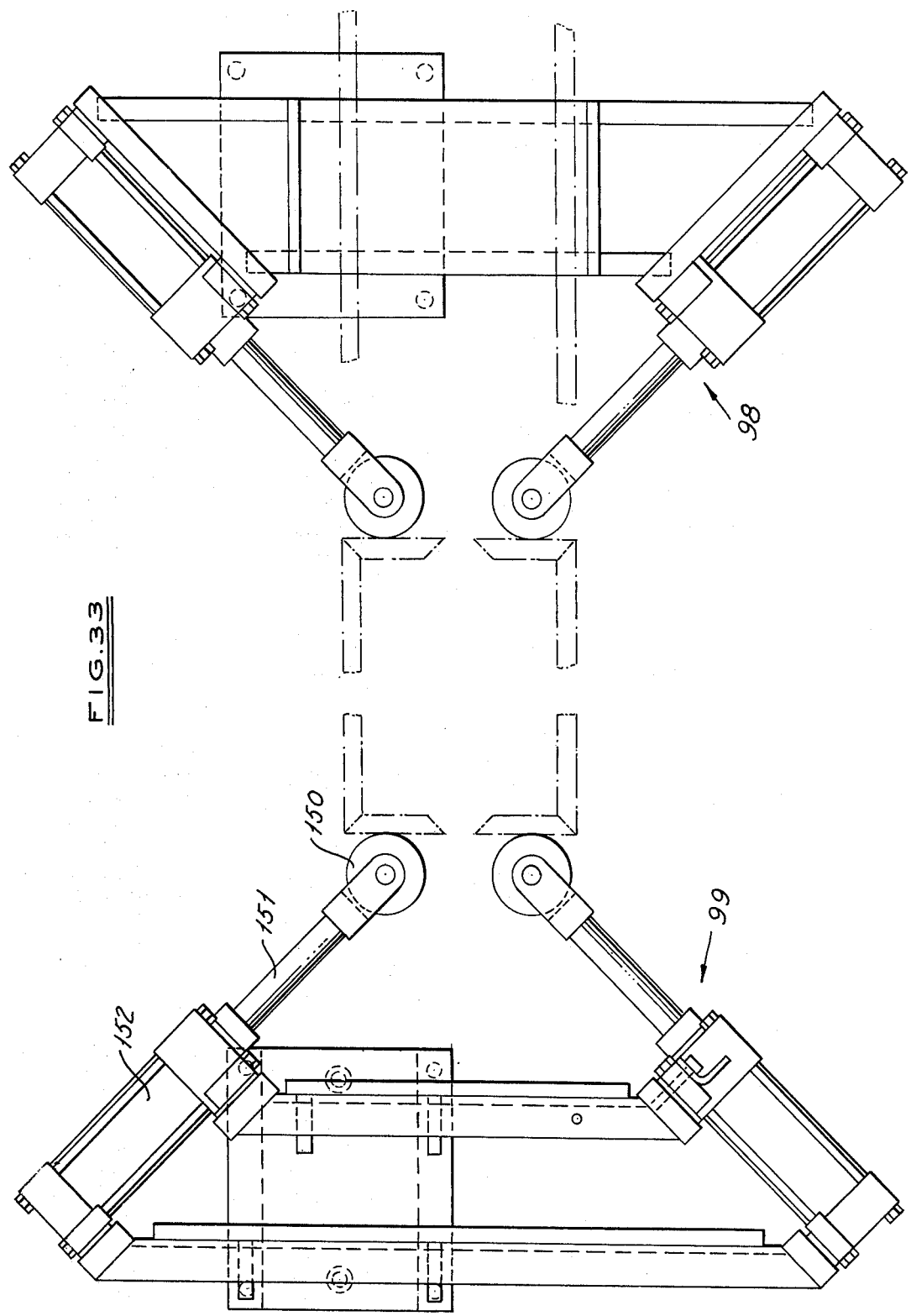

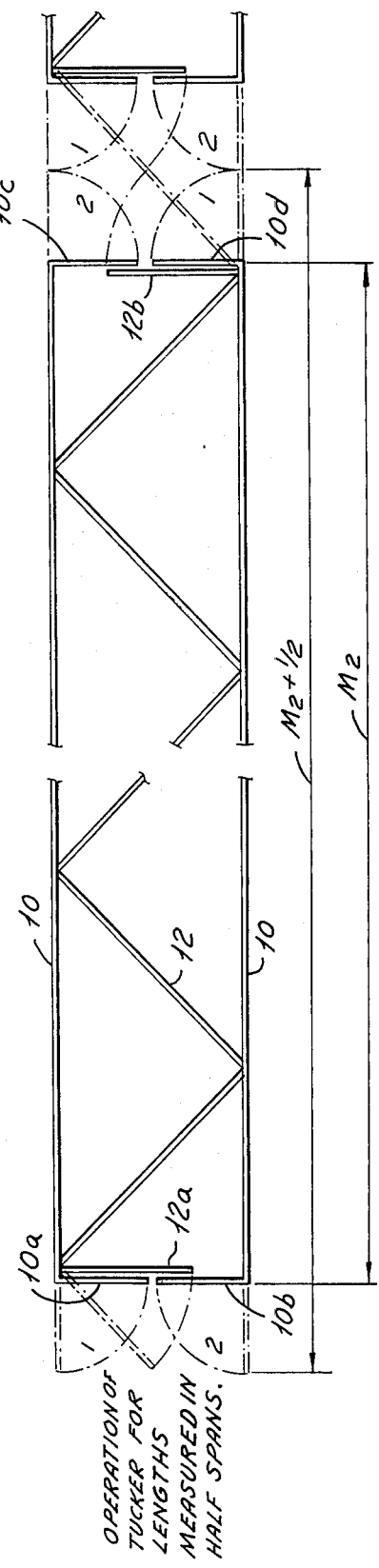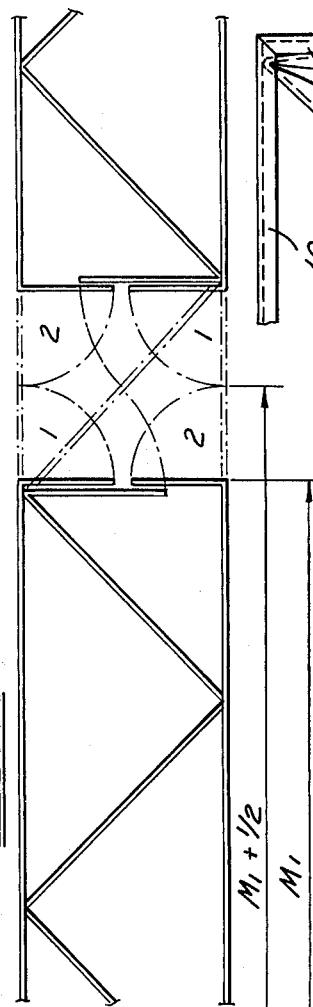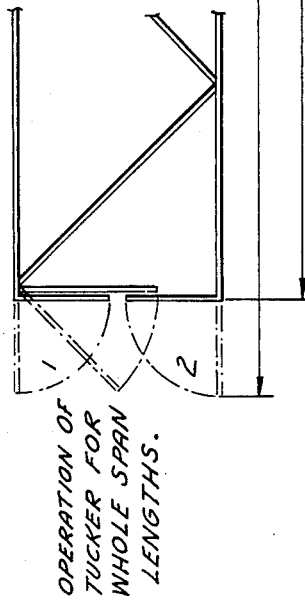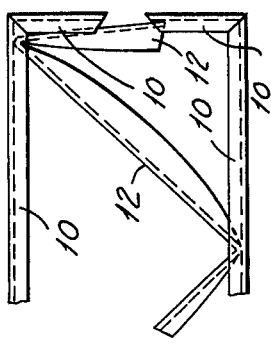

APPARATUS FOR MAKING TRUSS MEMBERS

This is a division of application Ser. No. 350,158, filed Apr. 11, 1973, now U.S. Pat. No. 3,827,117, which is, in turn, a continuation-in-part of application Ser. No. 129,040, filed Mar. 14, 1971, now abandoned.

This invention relates to a method and apparatus for making truss members.

BACKGROUND OF THE INVENTION

One type of low cost, strong truss member is that disclosed in my copending application Ser. No. 342,199, filed Mar. 16, 1973, titled "Truss Construction", and comprises oppositely disposed channels and an intermediate strut member comprising struts, each of which has a flat end portion and an intermediate non-flat portion forming alternately extending apices that are welded to the channel members.

Among the objects of the invention are to provide a method and apparatus for efficiently manufacturing such truss members at low cost with a minimum of labor and in a manner to provide uniformity and quality.

SUMMARY OF THE INVENTION

The invention comprises a method and apparatus for forming truss members which comprise oppositely disposed channel members and struts interconnected to one another by alternately extending apices wherein the apices are welded to the channel members. The method and apparatus provides for simultaneously forming channel members from a pair of endless strips and the strut members from an endless third strip guiding the channels in a predetermined relation to one another with the third strip therebetween and thereafter welding the apices to the channel members.

DESCRIPTION OF THE DRAWINGS

FIG. 1 is a fragmentary side elevational view of a truss member embodying the invention.

FIG. 2 is a sectional view taken along the line 2—2 in FIG. 1.

FIG. 3 is a fragmentary schematic side elevational view of an apparatus embodying the invention.

FIG. 4 is a plan view of the apparatus shown in FIG. 3.

FIG. 5 is a fragmentary side elevational view similar to FIG. 4 showing a portion of the apparatus in a different operative position.

FIG. 6 is a fragmentary sectional view on an enlarged scale taken along the line 6—6 in FIG. 3.

FIG. 7 is a fragmentary sectional view on an enlarged scale taken along the line 7—7 in FIG. 3.

FIG. 8 is a fragmentary sectional view on an enlarged scale taken along the line 8—8 in FIG. 3.

FIG. 9 is a fragmentary sectional view on an enlarged scale taken along the line 9—9 in FIG. 3.

FIG. 10 is a fragmentary plan view on an enlarged scale of a portion of the apparatus shown in FIG. 4.

FIG. 11 is a fragmentary sectional view on an enlarged scale taken along the line 11—11 in FIG. 10.

FIG. 12 is a fragmentary sectional view taken along the line 12—12 in FIG. 3.

FIG. 13 is a fragmentary sectional view taken along the line 13—13 in FIG. 3.

FIG. 14 is a fragmentary partly schematic plan view of a modified form of apparatus embodying the invention.

FIG. 15 is a fragmentary side elevational view of the apparatus as shown in FIG. 14.

FIG. 16 is a fragmentary sectional view on an enlarged scale taken along the line 16—16 in FIG. 14.

FIG. 17 is a fragmentary sectional view on an enlarged scale taken along the line 17—17 in FIG. 14.

FIG. 18 is a fragmentary sectional view on an enlarged scale taken along the line 18—18 in FIG. 17.

FIG. 19 is a fragmentary side elevational view on an enlarged scale of a portion of the apparatus shown in FIG. 17.

FIG. 20 is a fragmentary sectional view on an enlarged scale taken along the line 20—20 in FIG. 19.

FIG. 21 is a fragmentary view of an end portion of a truss member.

FIG. 22 is a fragmentary side elevational view of a further portion of the apparatus.

FIG. 23 is a fragmentary view similar to FIG. 22 showing the parts in a different operative position.

FIGS. 24A, 24B and 24C comprise a schematic diagram of a modified form of truss forming system.

FIGS. 25A, 25B and 25C are partly schematic side elevational views of the system shown in FIGS. 24A, B and C.

FIG. 26 is a fragmentary sectional view taken along the line 26—26 in FIG. 25B.

FIG. 27 is a fragmentary sectional view taken along the line 27—27 in FIG. 28.

FIG. 28 is a fragmentary sectional view taken along the line 28—28 in FIG. 27.

FIG. 29 is a fragmentary sectional view taken along the line 29—29 in FIG. 26.

FIG. 33 is a fragmentary side elevational view on an enlarged scale of another portion of the apparatus shown in FIG. 25C.

FIG. 34 is a fragmentary side elevational view of a truss made in accordance with the apparatus shown in FIGS. 25–33 showing the manner of bending the end portions.

FIG. 35 is a view similar to FIG. 34 showing a further modified form of truss forming.

FIG. 36 is a fragmentary view of a truss made in accordance with the invention.

DESCRIPTION

Figure 30:
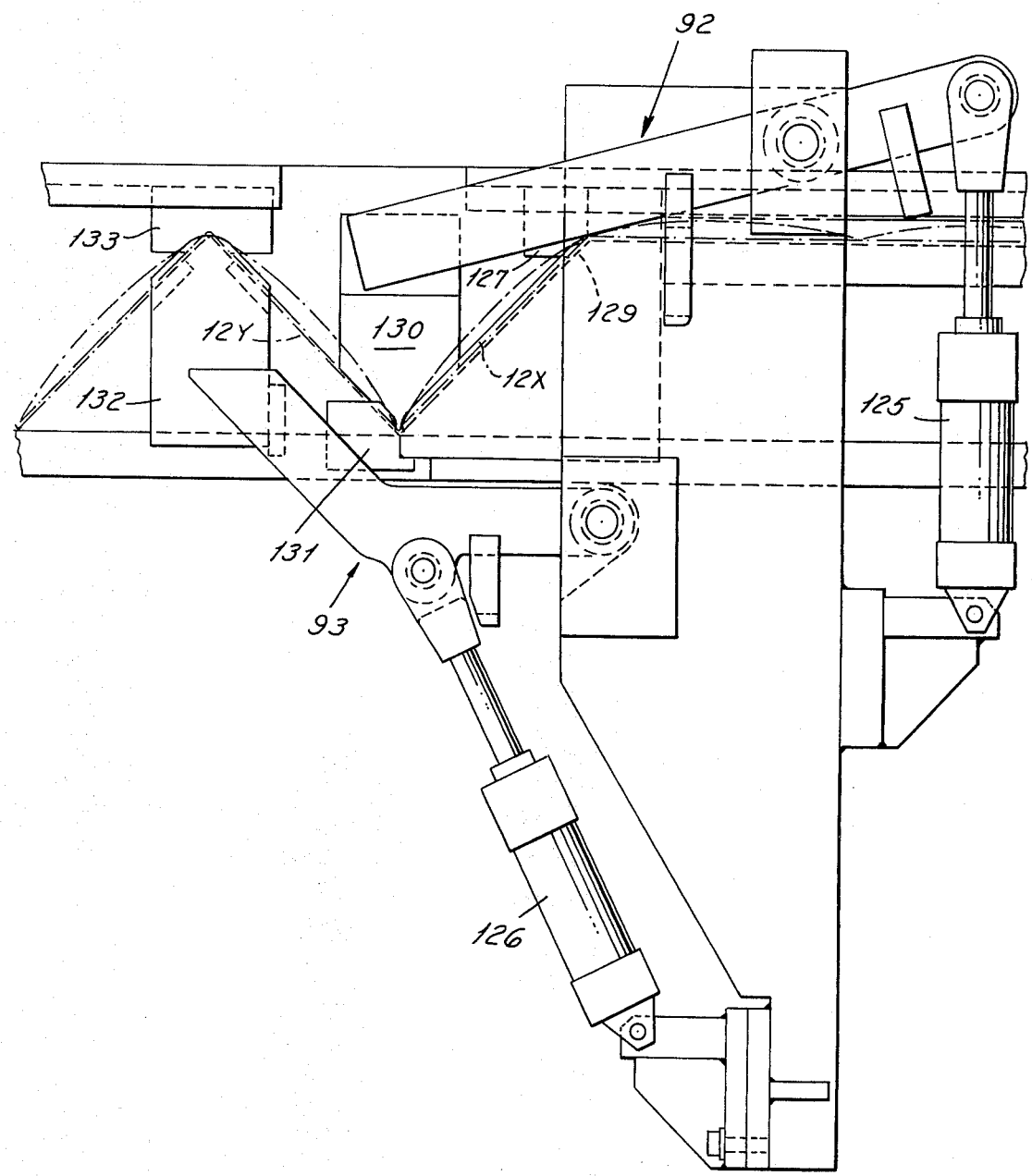
FIG. 30 is a fragmentary view on an enlarged scale of a portion of the apparatus shown in FIG. 25B.
Figure 31:
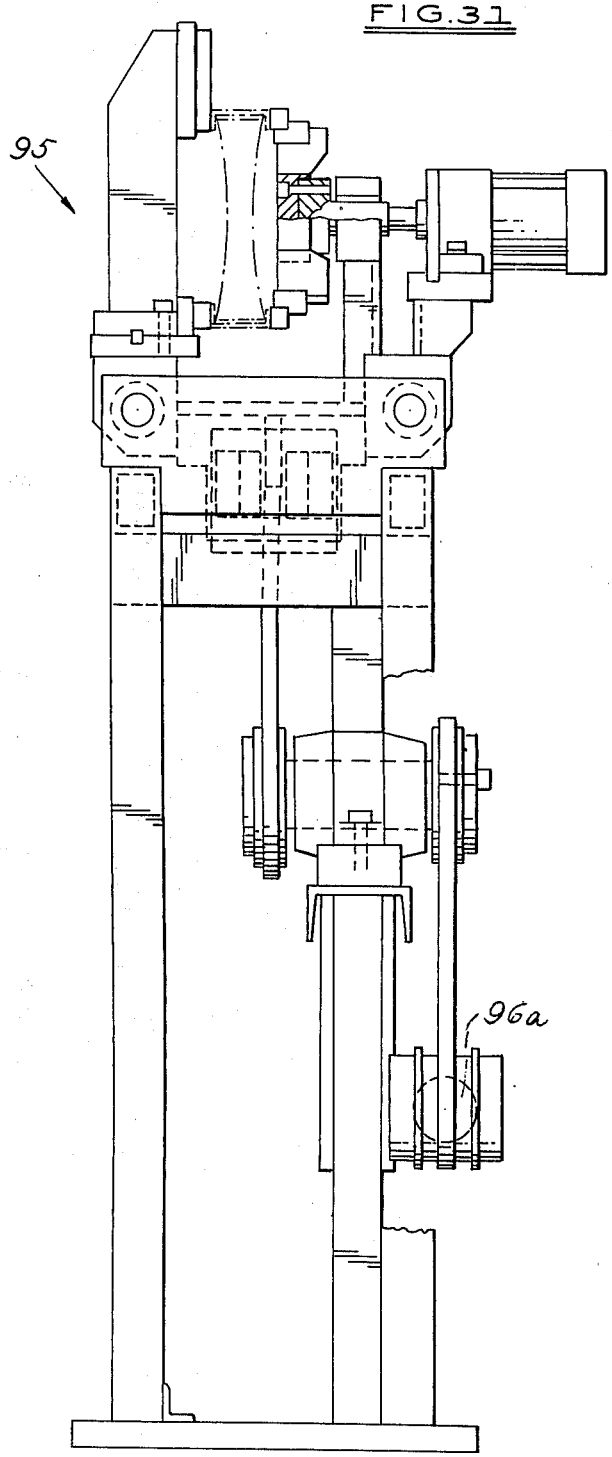
FIG. 31 is a fragmentary end view taken along the line 31—31 in FIG. 25C.

The method and apparatus embodying the invention is intended to manufacture truss members of predetermined length such as shown in FIGS. 1 and 2 which comprises oppositely disposed U-shaped channels 10 between which a strut member 11 is positioned comprising alternately extending struts 12 which have flat end portions 13 connected by non-flat intermediate portions 14 which are generally U-shaped in cross section at the center and gradually taper toward the flat end portions 13 at the ends. The strut member 11 is bent at the flat portions to form alternately extending apices 15. Reinforcing ribs 16 are provided in the flat portions as presently described. The apices are welded to the channels 10 to form the truss member. The end of the truss member may be formed with a shorter strut 11' that is welded as at 17 to one of the channels 10 (FIG. 21).

Referring to FIGS. 3 and 4, the channels 10 and strut members 11 are formed from strips of metal emanating from rolls 20, 21. The pair of strips from the rolls 20 passes through intermating pressure rolls 22, 23 to form the strips S into channel shapes that are oppositely disposed. The rollers 22, 23 continuously force the channels forwardly. At the same time, the strip T from the roll source 21 passes between driven pressure rollers 24, 25 to form interconnected struts 12 of the desired configuration. The strip T after being thus formed is continuously forced between continuously rotating bending members 27, 28. Each bending member 27, 28 includes a V-shaped portion 29 at one end and a complementary V-shaped portion 30 at the other end and is adapted upon rotation to engage the flat portions that interconnect the struts 12 and bend these portions in alternate directions as the members 27, 28 rotate to form alternately extending apices.

The thus formed and bent strut member is introduced between the strips S which have been shaped into channel cross section. The strips S after having been bent in channel cross section are guided at a predetermined distance apart from one another so that when the truss member is introduced therebetween, the proper position of the apices is located. The apices are then welded in the welding apparatus 31. The welding apparatus 31 is adapted to reciprocate back and forth along the path of the channel members as they are moved continuously, welding the apices to the channel member during the forward movement. Finally, at a cutoff station C, one or more cutoff rolls 32 are brought into position for cutting off a predetermined length of truss member.

Referring more specifically to FIGS. 6–9, the pressure rollers 22, 23, 24 and 25 are shaped to provide the desired cross sectional configuration to the strut strip.

Referring to FIGS. 3, 10–12, the welding apparatus 31 comprises a table 35 that is reciprocated back and forth along the path of the channel by a cylinder motor 36. One or more pairs of electrodes 37, 38 are provided for engagement with the apices. Each of the electrodes 38 has a piston motor 39 associated therewith for bringing the electrodes into engagement with the apex. In addition, the electrodes are mounted on a slide 41 on table 35 that is movable transversely by a piston motor 42 so that the electrodes can be moved into and out of position permitting longitudinal movement of the truss (FIG. 12). The movement of the table 35 longitudinally is adusted with the movement of the slide 41 so that the channels are not interrupted in their longitudinal movement.

As shown in FIG. 13, the cutter 32 may comprise a rotating abrasive disc mounted on the shaft of a drive motor 45, which, in turn, is mounted on a pivoted bracket 46 controlled by a piston motor 47 for swinging movement into and out of the path of the truss member.

In the form of the invention shown in FIGS. 14–20, the channel and strut member are formed intermittently by a press and the welding station may be stationary, as presently described.

A pair of strips S' from supply rolls 50 is fed into a press 51 where opposed dies 52, 53 are provided with an intermediate floating die 54. The dies 52, 53, 54 are adapted to shape the channels. The dies 52, 53, 54 further include spaced shaping portions 60, 61 for shaping a strip T' from another roll 61 to provide a predetermined shape to the intermediate strip that forms the strut member. Thus, by the single operation of a fluid ram 62, the press is able to simultaneously form the channels from the strip S' and the struts in the strip T'. Associated with the press 51 is a bending mandrel 62 that has a right angular pointed ram 63 that functions in association with right angular forming surface 64 so that when the ram 65 is actuated, a pair of struts is bent along the forming surface 64 (FIGS. 17, 19). When the mandrel 62 is moved out of the path, a pusher 66 functioning through a rod 67 and a feed device in the form of a fluid ram 68 advances a predetermined length of the strip S' to bring another length of the strip into position for forming another strut member.

The apparatus shown in FIGS. 22 and 23 is adapted to form the end structure shown in FIG. 21 and comprises a pressure member 75 that is pivotally mounted on a slide 76 movable into and out of position longitudinally of the truss member by a cylinder 77. Movement from the position shown in FIG. 23 to the position shown in FIG. 22 functions to bend the free end E of a strut member 12 to the shape shown in FIG. 22. Simultaneously, actuation of cylinder 78 assists in the forming operation and applies welding pressure. Application of current through the bending member 75 and associated base 79 causes the end to be welded to the associated channel member.

A modified form of truss forming system is shown in FIGS. 24A, 24B and 24C and comprises three motor driven strip supply rolls 80, each of which is controlled by a control 81 for feeding three strips to a movable gripper 82 that in turn intermittently feeds the three strips to a press 83. A clamp 84 functions to hold the strips during the return of the reciprocating feed 82 to its original position. The press 83 is driven by a motor 85 and includes a crankshaft 86 for operating the press 83 and simultaneously actuating notching dies 87 and forming dies 88. The notching dies 87 function to place cuts or notches at predetermined points on the flange forming portion of the channel forming strips at areas where the ends of the channels are to be bent to form the finished truss as shown in FIG. 36. Forming dies 88 serve to simultaneously form the top and bottom channels and the strut portions. The movement of gripper 82 longitudinally is controlled by a feed bar 89 that receives its drive from the crank 90 of the press.

As further shown in FIGS. 24B and C, at the end of the press, strut forming hammers 92, 93 are operated to bend the struts so that alternate apices are formed. The system also comprises an assembly device 91 wherein the channels that are previously formed are guided and the strut strip is guided to bring the strut and channels together.

As further shown in FIG. 24B, the assembled channels and strut are moved through the welder 94 where the apices are welded to the channels. The welded channels and strut assembly are then fed by an air operated gripper 95 driven by a feed bar 96a from the press 83 to feed a predetermined length S of the assembled truss successively into position. When the correct predetermined length of truss reaches a cut-off pilot or limit switch 96a, the cut-off device 96 is actuated to cut off the desired length of truss. The cut-off device 96 is adapted to be reciprocated back and forth longitudinally by a cylinder 97 to adjust the cut-off position to provide for successive lengths of truss whenever the truss is to have a whole number of full spans as its length. The resultant cut-off truss is clamped by a clamp 97a and the free ends are bent over by tucker units 98, 99 as presently described to form the truss shown in FIG. 36. The tucker units 98, 99 are controlled by a tuck pilot 98a or limit switch to which the truss is fed by a tuck feed 98b.

The actual apparatus utilized in the system shown in FIGS. 24A, 24B and 24C is shown in FIGS. 25A, 25B and 25C and for purposes of clarity, similar reference numerals are applied to similar apparatus.

As shown in FIG. 26, the press 93 includes dies 104, 105 for simultaneously forming the strips for the channels and the struts as well as dies 106 for notching the flange forming portions of the channel forming strips.

Referring to FIGS. 34 and 35, the truss made in accordance with the apparatus includes an end structure wherein the channels 10 and struts 12 are cut between successive struts providing free end portions 10a, 10b, 12a at one end and 10c, 10d and 12b at the other which are folded over to form closed ends for the truss structure. At the areas of cut-off and fold-over, it is desirable to cut or notch the flange forming portions of the strips which form the channels so that the cut-off of the desired length and the bend or fold-over of the free end portions can be achieved readily.

In addition, where the finite length of the final truss is a whole multiple of the span S between adjacent apices, provision is made for reciprocatingly shifting the cut-off device 96 and notching dies 106 in order to sever between apices as is required and as is shown in FIG. 34.

As shown in FIGS. 27 and 28, the notching dies 106 are supported on a plate 107 yieldingly mounted by springs 108, 109 and guide pins 110 between the movable platen 111 and fixed platen 112 of the press 83. The movable platen 111 and fixed platen 112 support a plurality of fixed notching die members 113, 114. The plate 107 supports movable notching die members 115 that are positionable for cooperation with the die members 113, 114 to cut or notch the flange forming portions of the strips 10. Die members 115 are moved into position for notching by cam plates 116 that are reciprocable within the plate 107 by air cylinders 117. The air cylinders 117 are actuated selectively under the control of notch pilot 87a which controls the flow of air to the appropriate cylinders for setting the die members 115 into position for notching the strips 10 when the press is operated. As shown in FIG. 28, the two strips 10 are simultaneously cut or notched at the appropriate places for subsequent severing by the saw 96 and for bending by the tucker units 98, 99.

Referring to FIG. 29, the dies 104, 105 for forming the channels and shaping the struts are mounted on the movable and fixed platens 111, 112 and comprise cooperating die members 120, 121, the members 121 being mounted on an intermediate floating plate 122 to form both channels in one movement of the press. The dies 105 comprise die members 123, 124 which function to form two struts in one stroke of the press. As shown in FIG. 30, there is a clearance between the dies 123, 124 minimizing stretching of the metal and permitting the strut to curve longitudinally with respect to its axis with the free ends of the walls of the strut under tension.

Referring to FIG. 30, the strut bending hammers 92, 93 are operated by fluid cylinders 125, 126. Hammer 92 includes a movable anvil 127 cooperating with a fixed anvil 129 and a movable anvil 130 that cooperates with an anvil 131 on hammer 93. Hammer 93 further includes an anvil 132 cooperating with a fixed anvil 133. In operation, the hammer 92 is first actuated to bend a first portion 12x of the strut strip downwardly and then hammer 93 is actuated to bend a second portion 12y upwardly. It can thus be seen that the hammers 92, 93 function to bend the strut without moving it out of the line of movement of the channel portions thereby facilitating the combining of the channels and the struts in the assembly mechanism 91.

The welding mechanism 94 is substantially identical to that heretofore described.

Figure 32:
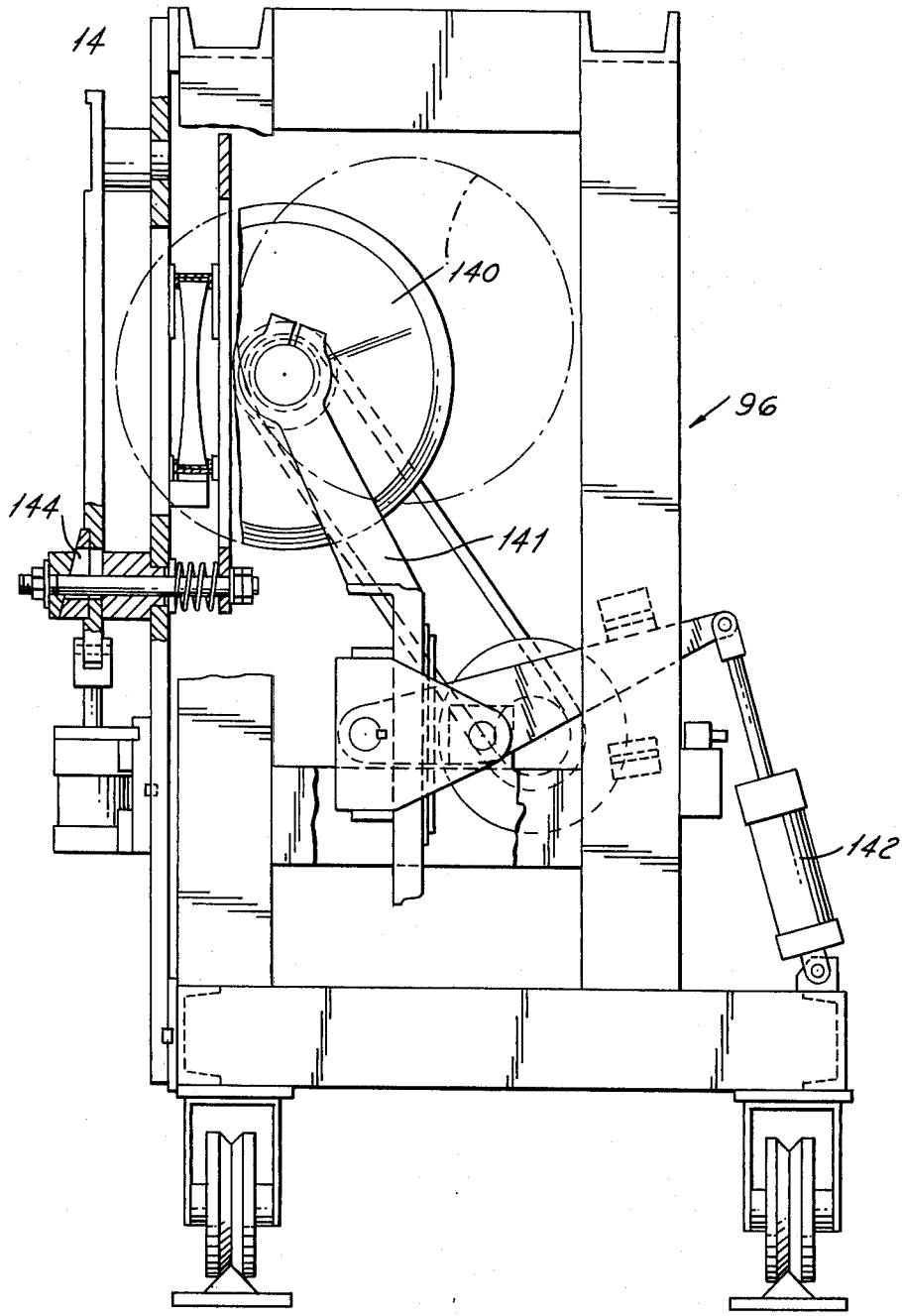
FIG. 32 is a fragmentary sectional view taken along the line 32—32 in FIG. 25C.

As shown in FIG. 32, the cut-off device or saw 96 comprises a rotary blade 140 mounted for swinging movement on an arm 141 actuated by a fluid operated cylinder 142 during the cutting operation, the assembled channel and structure being clamped between the jaws of a clamping mechanism 142a, 142b actuated by an inclined cam 144. Cut-off pilot 96a is actuated by the end of the truss assembly to produce a signal for actuating the cut-off device 96. At the termination of the cut-off, an appropriate pilot or limit switch, not shown, produces a signal for actuating the transport cylinder 97 to shift the cut-off device 96 and to actuate the cylinder 87a to shift the notching dies.

Referring to FIG. 33, the tucker units 98, 99 comprise rollers 150 mounted on the ends of the shafts 151 of air cylinders 152 for movement diagonally inwardly at an angle of 45° to bend the free ends of the channels and struts by the simple expedient of a force thereon. Since the notching or cuts have heretofore been provided in the channels, these forces cause the channels and strusses to bend in the manner shown in FIGS. 34 and 35.

As shown diagrammatically in FIGS. 34, 35 and 36, the air cylinders for moving the rollers 150 are actuated in such a manner that the portions 10a and 12a at one end and 10d and 12b at the other are bent inwardly first and thereafter the portions 10b and 10c are bent inwardly. The numbers shown outside of the truss portions represent the sequence of bending. Where the length of the truss comprises a whole number of full spans, the saw and notching dies must be shifted after each cut whereas where the length of the truss comprises a whole number of spans plus a half span, no shifting is required. The resultant truss has an end such as shown in FIG. 36.

All operations are controlled or timed by the rotary limit switch which turns with the press crankshaft. The cycle to make one span of the truss starts when the crankshaft is 90° past top dead center and ends when the crankshaft makes a complete revolution.

From 90° to 270° is the processing cycle when
1. The top and bottom channels are formed by dies 10.
2. Two elements of the strut are formed.
3. The strut elements are bent into the zig-zag shape by the forming hammers 92, 93.
4. Elective operations when pilots or limit switches are actuated.
   a. Cut-off when truss is fed past the cut-off pilot.
   b. Notching if the truss has been fed past the notch pilot.
   c. Initiation of end tucking operation.

From 270° to 90° is the feed cycle when
1. Clamp on feed mechanism 84 is released.
2. Grippers on feed slide 82 are engaged.

3. Both strut form hammers 92, 93 are retracted.
4. Elective operations when pilots are actuated.
   a. Engagement of notch die punches 115 when notch pilot is actuated.
   b. Transport of notching die and cut-off unit if controls have been pre-set for this.

The tuck operation, initiated during the processing cycle is as follows:

When cut-off is initiated the tuck feed cylinder is operated and the tucker feed roll feeds the truss up to the tuck pilot.

Operation of tucker pilot:
1. Starts end tuck timer.
2. Lifts tucker feed roller 98b.
3. Operates work clamps 84, 95 to hold trusses in place.
4. Tucker cylinders 152 make tuck in pre-set sequence.

End tuck time ends
1. Work clamps are released.
2. Tucker cylinders 152 are retracted.
3. Run out trap 97 opens. Notch, cut-off and tuck pilots are released.
4. Trap open timer starts. Trap open time ends. Trap closes.

It can thus be seen that there has been provided a method and apparatus for forming truss members in predetermined lengths without the necessity of manual handling.

I claim:

1. An apparatus for making truss members comprising
   means for intermittently feeding three endless strips to a pressing station,
   press means at said pressing station operable intermittently to form a pair of said endless strips into parallel channels, said channels having a base and flanges and to form said third strip into a plurality of interconnected struts,
   each strut comprising a non-flat portion and being connected to adjacent struts by flat end portions,
   means operable intermittently to bend the third strip at said flat portions to form alternately extending apices,
   means for thereafter bringing the third strip between said pair of channels with alternate apices contacting opposite channels,
   means for welding said channels to said apices,
   means in advance of said press means operable periodically to cut flanges of opposite channels at predetermined points,
   means for cutting the assembled truss members at certain of said cut flange portions to form a truss section having free ends on said channels and struts,
   and end bending means for bending the free ends of the channels and struts inwardly toward one another at other of said cut portions.

2. The combination set forth in claim 1 wherein said means for cutting said flanges comprising selectively controlled means operable to selectively cut said flange forming portions as the press means is periodically operated.

3. The combination set forth in claim 2 including means responsive to the length of said truss to actuate said cutting means.

4. The combination set forth in claim 2 wherein said last-mentioned means is operable to simultaneously cut the flange forming portions of both of said channel forming strips.

5. The combination set forth in claim 1 wherein said means operable intermittently to bend the third strip at said flat portions to form alternately extending apices comprises a first fixed anvil and a movable anvil for bending said third strip at said flat portion,
   a second pair of movable anvils adapted to engage another flat portion downstream of said first pair of anvils to form an apex,
   and a third fixed and movable pair of anvils downstream of said first and second anvil pairs adapted to complete the apex of a previously bent flat portion.

6. The combination set forth in claim 5 wherein said movable anvil of said first pair and one of said anvils of said second pair are mounted on a single lever pivoted for movement, said second anvil of said second pair and said movable anvil of said third pair being mounted on a second lever pivoted for movement toward and away from the first lever.

7. The combination set forth in claim 1 wherein said means for bending said channels at certain of said areas adjacent the cut portions of the flanges comprises members movable at an angle to the axis of the channels for applying a bending force adjacent the cut portions of the flanges to bend the base portions of the flanges at the cut portions.

8. The combination set forth in claim 1 wherein said truss cutting means is movable longitudinally.

9. The combination set forth in claim 1 including means for moving said flange cutting means longitudinally.

10. The combination set forth in claim 1 wherein said end bending means comprises fluid operated cylinders having members engaging the free end portions of said channels.

11. An apparatus for making truss members which comprise oppositely disposed channel members and struts interconnected to one another by alternately extending apices wherein the apices are welded to the channel members, which apparatus comprises
    means for intermittently moving a pair of flat channel forming strips and a flat strut forming strip through a forming station,
    intermittently actuated means at said forming station for simultaneously pressing the channel forming strips and the strut forming strip to form the channel forming strips into channel shapes that are oppositely disposed and to shape the strut strip into a pair of struts which have non-flat intermediate portions which are generally U-shaped in cross section at the center and gradually tapered toward a flat end portion at the ends,
    said last-mentioned means comprising first means including parts movable toward and away from one another in a substantially single plane for simultaneously forming said channel forming strips into channels and second means laterally displaced from said first means including parts movable toward and away from the one another for forming said strut forming strip into said struts, said first and second means being operable in unison to move said respective parts toward one another and simultaneously form said channels and said struts,
    means for thereafter bending said previously formed struts at the flat portions to provide two struts connected by an apex, means for guiding said struts to the plane of said formed channels, and means for welding the apices to said channel members at a welding station.

12. The apparatus set forth in claim 11 wherein said means for bending the previously formed struts is positioned immediately adjacent said forming station.

13. The apparatus set forth in claim 12 wherein said means for forming said channel forming strips comprises oppositely disposed dies which are moved toward and away from one another, said means for bending said struts cooperating with said dies to bend said struts.

14. An apparatus for making truss members which comprise oppositely disposed channel members and struts interconnected to one another by alternately extending apices wherein the apices are welded to the channel members, which apparatus comprises means for intermittently moving a pair of flat channel forming strips and a flat strut forming strip through a forming station, means at said forming station for simultaneously pressing the channel forming strips and the strut forming strip to form the channel forming strips into channel shapes that are oppositely disposed and shape the strut strip into a pair of shaped struts which have flat end portions connected by non-flat intermediate portions which are generally U-shaped in cross section at the center and gradually tapered toward the flat end portion at the ends, said last-mentioned means comprising first means including parts movable toward and away from one another in a substantially single plane for simultaneously forming said channel forming strips into channels and second means laterally displaced from said first means including parts movable toward and away from one another for forming said strut forming strip into said struts, said first and second means being operable in unison to move said respective parts toward one another and simultaneously form said channels and said struts, means for thereafter bending said previously formed strut portions at said flat portions with respect to the remainder of said strip portion to provide alternating extending apices, means for guiding said formed strut portions to the plane of said formed channel portions and thence to a welding station, and means for welding the apices to said channel members at said welding station.

15. The apparatus set forth in claim 14 and wherein said means for bending the previously formed struts is positioned immediately adjacent the forming station.

16. The apparatus set forth in claim 15 wherein said means for forming said channel forming strips comprises oppositely disposed dies which are moved toward and away from one another, said means for bending said strut portions cooperating with said dies to bend said strut portions.

* * * * *